US011919988B2

(12) United States Patent
Kuan et al.

(10) Patent No.: US 11,919,988 B2
(45) Date of Patent: Mar. 5, 2024

(54) THERMOPLASTIC POLYETHER ESTER ELASTOMER COMPOSITION AND PRODUCT COMPRISING THE SAME

(71) Applicant: CHANG CHUN PLASTICS CO., LTD., Taipei (TW)

(72) Inventors: Chen-Yu Kuan, Taipei (TW); Chung-Hao Tseng, Taipei (TW); Te-Shun Lin, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 196 days.

(21) Appl. No.: 17/369,584

(22) Filed: Jul. 7, 2021

(65) Prior Publication Data
US 2022/0372194 A1 Nov. 24, 2022

(30) Foreign Application Priority Data

May 14, 2021 (CN) .......................... 202110526315.X
May 14, 2021 (TW) ................................. 110117408

(51) Int. Cl.
C08F 283/06 (2006.01)
(52) U.S. Cl.
CPC .................................. C08F 283/06 (2013.01)
(58) Field of Classification Search
None
See application file for complete search history.

(56) References Cited

U.S. PATENT DOCUMENTS

| 3,663,653 A | 5/1972 | Frohlich et al. |
| 6,608,168 B1 | 8/2003 | Ng |

FOREIGN PATENT DOCUMENTS

| CN | 1480477 | A |   | 3/2004 |
| CN | 103012761 | A |   | 4/2013 |
| CN | 109476869 | A | * | 3/2019 |
| CN | 113461921 | A |   | 10/2021 |
| JP | 2002-060466 | A |   | 2/2002 |
| JP | 2003-147058 | A |   | 5/2003 |
| JP | 2004-277560 | A |   | 10/2004 |
| JP | 3714748 | B2 | * | 11/2005 |
| JP | 2007-291277 | A |   | 11/2007 |
| JP | 2010-24439 | A |   | 2/2010 |
| JP | 2011-219724 | A |   | 11/2011 |
| JP | 2020502373 | A | * | 1/2020 |
| JP | 2022-143482 | A |   | 10/2022 |
| KR | 101405525 | B1 | * | 6/2014 |
| KR | 2021-0037259 | A |   | 4/2021 |
| TW | 201331259 | A1 |   | 8/2013 |
| WO | 01/04174 | A1 |   | 1/2001 |

OTHER PUBLICATIONS

Taiwan Intellectual Property Office's Examination Report, dated Aug. 17, 2021, of corresponding patent application TW 110117408.
CNIPA Examination Report of this application's counterpart application in China, Application No. 202110526315.X (dated Aug. 9, 2022).
Kobayashi et al., "Thermal Character of Polyester Elastomers", Kobunshi Ronbunshu (Collection of Theses on Polymers), vol. 49, No. 8, pp. 687-696, Aug. 1992.
Peng et al., "Preparation and Characterization of Terpoly(Ester-Ether) Synthesized with PTMG of Different Molecular Weight", Packaging Journal, vol. 3, No. 1, Jan. 2011.
Zhang et al., "Synthesis and characterization of low melting point PET-PTMG copolyether ester", China Synthetic Fiber Industry, 33(3): 206, Mar. 2010.
Japan Patent Office Examination Report of this application's counterpart application in JPO, Application No. 2021-131368 (dated Dec. 20, 2022).
Taiwan Intellectual Property Office's Approval Notification dated Jul. 18, 2023, for this application's counterpart application in Taiwan (Application No. 110117408).
China National Intellectual Property Administration's Approval Notification dated Mar. 8, 2023. for this application's counterpart application in China (Application No. 202110526315.X).

(Continued)

*Primary Examiner* — Tae H Yoon
(74) *Attorney, Agent, or Firm* — PAI PATENT & TRADEMARK LAW FIRM; Chao-Chang David Pai

(57) ABSTRACT

Provided is a thermoplastic polyether ester elastomer composition having a first chain represented by the following Formula (I) and a second chain represented by the following Formula (II), which are connected to each other:

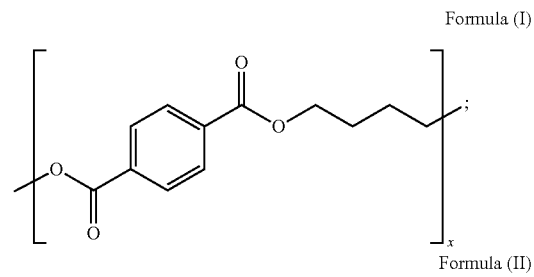

Formula (I)

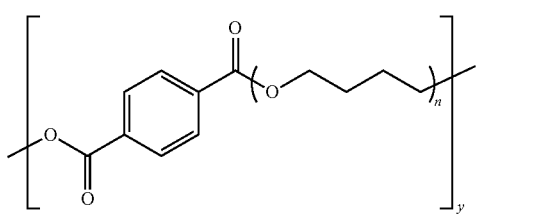

Formula (II)

Wherein, the melting point of the thermoplastic polyether ester elastomer composition ranges from 80° C. to 160° C., and the enthalpy of fusion of the thermoplastic polyether ester elastomer composition is greater than 6 J/g. Production of the thermoplastic polyether ester elastomer composition has low energy consumption and facilitates smooth cutting strands into pellets, which is beneficial to mass production of the thermoplastic polyether ester elastomer composition.

11 Claims, 1 Drawing Sheet

(56) References Cited

OTHER PUBLICATIONS

Taiwan Intellectual Property Office's Examination Report of corresponding patent application in Taiwan (Application No. 110117408), dated Dec. 13, 2021.
Japan Patent Office Examination Report of this application's counterpart application in JPO (Application No. 2021-131368): Decision of Refusal, dated May 9, 2023.
Japan Patent Office Examination Report of this application's counterpart application in JPO (Application No. 2021-131368): Third Opinion, dated Apr. 18, 2023.
Taiwan Intellectual Property Office's Examination Report of corresponding patent application in Taiwan (Application No. 110117408): Decision of Refusal, dated May 16, 2023.

* cited by examiner

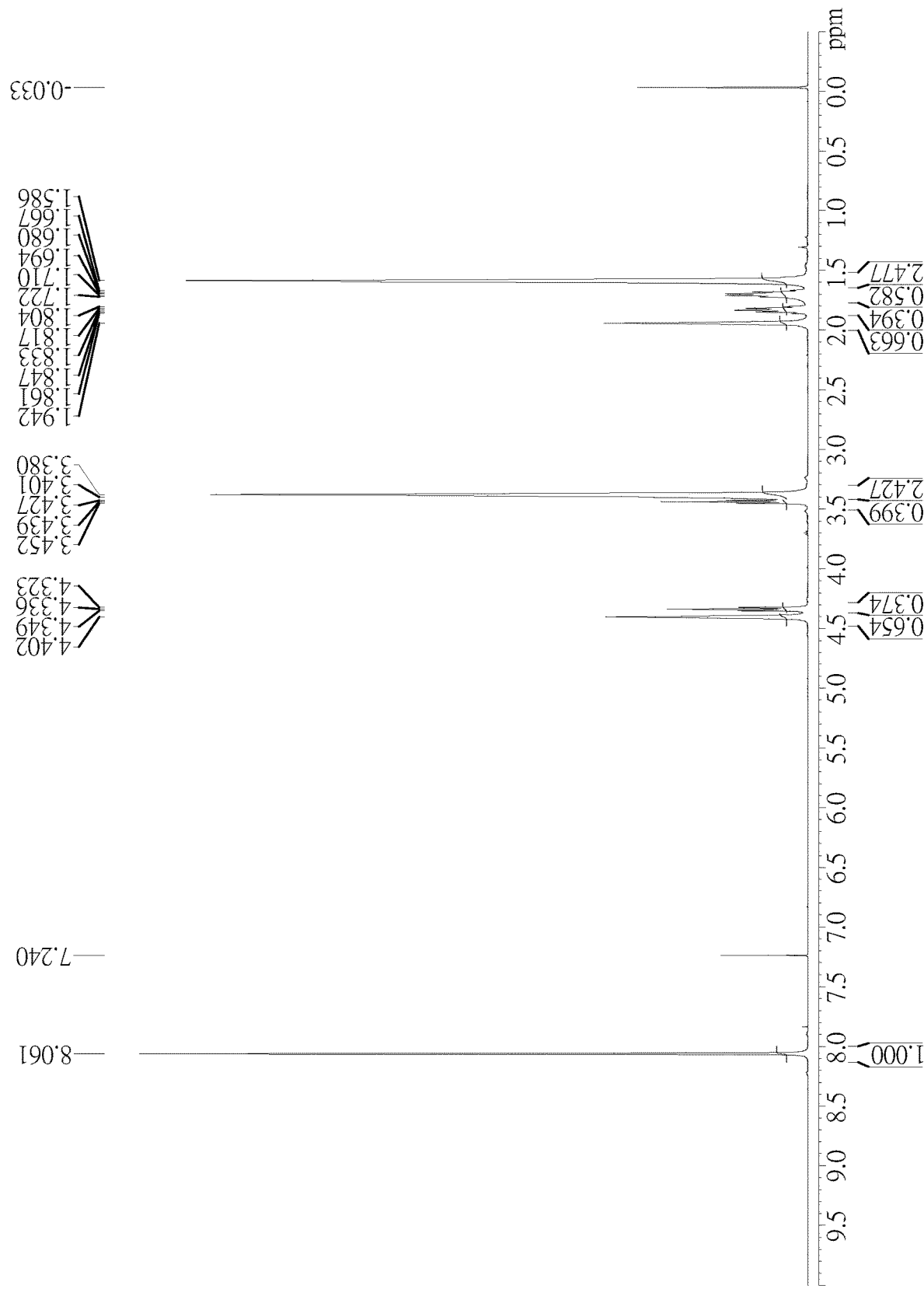

THERMOPLASTIC POLYETHER ESTER ELASTOMER COMPOSITION AND PRODUCT COMPRISING THE SAME

CROSS-REFERENCE TO RELATED APPLICATION

Pursuant to 35 U.S.C. § 119(a), this application claims the benefits of the priority to Taiwan Patent Application No. 110117408, filed May 14, 2021, and the priority to China Patent Application No. 202110526315.X, filed May 14, 2021. The contents of the prior application are incorporated herein by its entirety.

BACKGROUND OF THE INVENTION

1. Field of the Invention

The instant disclosure relates to a resin composition and a product comprising the same, more particularly to a thermoplastic polyether ester elastomer composition and a product comprising the same.

2. Description of the Prior Arts

Thermoplastic elastomer is a polymer material with a nature between rubber and plastic. Because thermoplastic elastomer has the properties of flexibility as rubber and processability as plastic, it has been widely applied in various fields.

Thermoplastic elastomer is generally divided into thermoplastic polyolefin elastomer (TPO elastomer), thermoplastic polyether ester elastomer (TPEE), thermoplastic styrene elastomer (TPS elastomer), thermoplastic polyurethane elastomer (TPU elastomer), thermoplastic vulcanizate elastomer (TPV elastomer), and thermoplastic polyamide elastomer (TPA elastomer).

Thermoplastic elastomer has advantages of accessibility and great varieties. It is mainly divided into block copolymer, graft copolymer, and polymer blend. Common block copolymer on the market such as ethylene-vinyl acetate copolymer (EVA) consists of ethylene and vinyl acetate. With the property of low melting point, EVA can be melted and blended at low temperature, which is able to control or reduce energy consumption. However, EVA has poor durability, which urges researchers to actively seek for thermoplastic elastomer such as TPEE.

TPEE is a block copolymer composed of a hard segment consisting of polyester and a soft segment consisting of polyether. TPEE can provide great cushioning, resilience, thermal resistance and chemical resistance. Particularly, TPEE is able to offer great resilience and durability at low temperature, which makes TPEE become the first choice in various fields that require harsh conditions of production.

Although TPEE of high melting point can provide great thermal resistance, TPEE requires relatively high temperature to perform cross-linking reaction. Subsequently, production of TPEE consumes more energy, which is not beneficial to mass production. In view of this, applicant is seeking TPEE with low melting point to reduce the energy consumption and manufacturing cost for the production of TPEE. However, some manufacturing problems are found; for example, a cutting blade is easily wrapped and/or wound such that cutting strands into pellets cannot proceed smoothly, the quality of aforesaid pellets is not acceptable, and the size of aforesaid pellets is not uniform; these problems easily occur at the stage of cutting strands into pellets. Besides, aforesaid pellets are more likely to get stuck to each other at the subsequent process of packing, transportation or storage. Accordingly, conventional TPEE with low melting point is still not beneficial to mass production.

SUMMARY OF THE INVENTION

In view of this, an objective of the instant disclosure is to modify a TPEE composition, which has low energy consumption and release of restrictions related to cutting strands into pellets or subsequent manufacturing process. With aforesaid merits, the TPEE composition of the instant disclosure is beneficial to mass production.

To achieve aforementioned objective, the instant disclosure provides a thermoplastic polyether ester elastomer (TPEE) composition comprising a first chain and a second chain connected to each other;

the first chain represented by the following Formula (I):

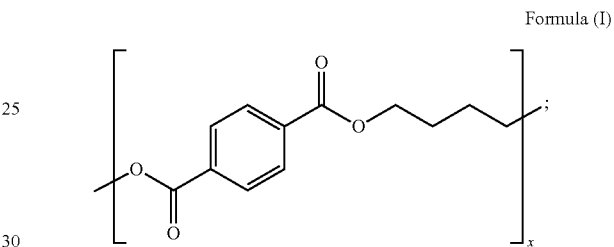

Formula (I)

the second chain represented by the following Formula (II):

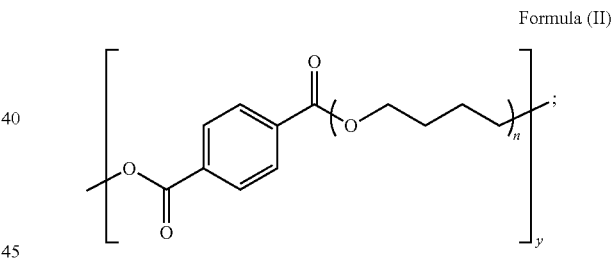

Formula (II)

wherein, the melting point of the TPEE composition is greater than or equal to 80° C. and less than or equal to 160° C., and the enthalpy of fusion (ΔHm) of the TPEE composition is greater than 6 J/g.

By controlling the melting point and the enthalpy of fusion of the TPEE composition of the instant disclosure, the TPEE composition of the instant disclosure can be manufactured at low temperature, and the problems related to cutting strands into pellets and subsequent manufacturing process can be avoided. Therefore, the objective of mass production of TPEE composition can be achieved. In other words, compared to the prior art, mass production of the TPEE composition of the instant disclosure is feasible.

Preferably, the number-average molecular weight (Mn) of $(O(CH_2)_4)_n$ in the second chain in the above Formula (II) may be greater than or equal to 500 and less than or equal to 1200. In one of the embodiments, the Mn of $(O(CH_2)_4)_n$ in the second chain may be, but is not limited to, 500, 550, 600, 650, 700, 750, 800, 850, 900, 950, 1000, 1050, 1100, 1150 or 1200. The Mn of $(O(CH_2)_4)_n$ in the second chain may fall within the ranges between any two of the above values. More preferably, the Mn of $(O(CH_2)_4)_n$ in the second chain may be greater than or equal to 500 and less than or equal to 1000.

Preferably, the ratio of the average repeated unit of the first chain to the second chain (the ratio of x to y, abbreviated as x/y) of the TPEE composition in the above Formula (I) and Formula (II) may be more than or equal to 0.5 and less than or equal to 2.0. In one of the embodiments, the x/y may be, but is not limited to, 0.5, 0.6, 0.7, 0.8, 0.9, 1.0, 1.1, 1.2, 1.3, 1.4, 1.5, 1.6, 1.7, 1.8, 1.9 or 2.0. The x/y may fall within the ranges between any two of the above values.

Preferably, n in the above Formula (II) may be greater than or equal to 6 and less than or equal to 15. In one of the embodiments, n may be, but is not limited to, 6, 7, 8, 9, 10, 11, 12, 13, 14 or 15 and may fall within the ranges between any two of the above values. More preferably, n may be greater than or equal to 7 and less than or equal to 13.

Preferably, the content of the second chain in the TPEE composition may be greater than or equal to 55 wt % and less than or equal to 83 wt %. In one of the embodiments, the content of the second chain in the TPEE composition may be, but is not limited to, 55 wt %, 56 wt %, 57 wt %, 58 wt %, 59 wt %, 60 wt %, 61 wt %, 62 wt %, 63 wt %, . . . , 82 wt % or 83 wt %. The content of the second chain in the TPEE composition may fall within the ranges between any two of the above values. More preferably, the content of the second chain in the TPEE composition may be greater than or equal to 60 wt % and less than or equal to 82 wt %.

In one of the embodiments, the TPEE composition of the instant disclosure may be synthesized by dimethyl terephthalate (DMT), 1,4-butanediol (BDO), and poly(tetramethylene ether) glycol (PTMEG) through condensation reaction. In another embodiment, the TPEE composition of the instant disclosure may be synthesized by p-terephthalic acid (PTA), BDO, and PTMEG through condensation reaction.

In one of the embodiments, the melting point of the TPEE composition may be greater than or equal to 80° C. and less than or equal to 160° C., and the enthalpy of fusion of the TPEE composition may be greater than 6 J/g. As mentioned above, the TPEE composition of the instant disclosure can be manufactured at low temperature, and the problems related to cutting strands into pellets and subsequent manufacturing process can be avoided, which are beneficial to mass production of the TPEE composition of the instant disclosure.

In another embodiment, the melting point of the TPEE composition may be greater than or equal to 80° C. and less than or equal to 120° C., and the enthalpy of fusion of the TPEE composition may be greater than 6 J/g. As mentioned above, the TPEE composition of the instant disclosure is not only suitable for mass production, but also able to be manufactured by process equipment of EVA depending on different needs, which has the merit of saving manufacturing cost.

In another embodiment, the melting point of the TPEE composition may be controlled to be less than 140° C., and the enthalpy of fusion of the TPEE composition may be greater than 6 J/g. In other embodiments, a crosslinking agent and/or a crosslinking-assisting agent may be optionally added to the TPEE composition to increase thermal resistance and weather resistance. In one of the embodiments, aforesaid crosslinking agent may be, but is not limited to, dicumyl peroxide, 2,5-dimethyl-2,5-di-(tert-butylperoxy)hexane, sulfur or bis(tert-butyl peroxy-isopropyl) benzene, and aforesaid crosslinking-assisting agent may be, but is not limited to, triallyl isocyanurate.

In other embodiments, the melting point of the TPEE composition may be, but is not limited to, 80, 85, 90, 95, 100, 105, 110, 115, 120, 125, 130, 135, 140, 145, 150, 155 or 160° C. The melting point of the TPEE composition may fall within the ranges between any two of the above values. On the other hand, the enthalpy of fusion of the TPEE composition may be, but is not limited to, 6, 7, 8, 9, 10, 11, 12, 13, 14, 15, 16, 17, 18, 19 or 20 J/g. The enthalpy of fusion of the TPEE composition may fall within the ranges between any two of the above values.

Additionally, the instant disclosure provides a TPEE product comprising aforesaid TPEE composition.

The TPEE product of the instant disclosure may be, but is not limited to, a shoe material, a wire material, a sealing material, an electronic device case, a wire material of 3D printing, a vehicle material, an insulation material of power cord, a foam material, a medical treatment container, a medical treatment tube, a packaging material, an acoustic insulation material or a thermal insulation material.

BRIEF DESCRIPTION OF THE DRAWING(S)

FIG. 1 is a proton nuclear magnetic resonance ($^1$H-NMR) spectrum of the TPEE composition of Example 1.

DETAILED DESCRIPTION OF THE PREFERRED EMBODIMENTS

Hereinafter, multiple examples are provided to illustrate the implementation of the TPEE composition and the product thereof of the instant disclosure, while multiple comparative examples are provided as comparison. A person having ordinary skill in the art can easily realize the advantages and effects of the instant disclosure from the following examples and comparative examples. The descriptions proposed herein are just preferable embodiments for the purpose of illustrations only, not intended to limit the scope of the instant disclosure. Various modifications and variations could be made in order to practice or apply the instant disclosure without departing from the spirit and scope of the instant disclosure.

(TPEE Composition)

EXAMPLE 1

The production of the TPEE composition of Example 1 is described as follows.

A mixture of dimethyl terephthalate (DMT, 259 g), 1,4-butanediol (BDO, 175 g), and poly(tetramethylene ether) glycol (PTMEG, 300 g) with number-average molecular weight (Mn) of 650 was charged into a 3-liter autoclave, and then titanium butoxide treated as catalyst (TBT, 1.2 g) was added. The temperature of the autoclave was set to be 210° C. to 230° C., and esterification was carried out.

Methanol (melting point: 64.7° C.) was generated as by-product during esterification. Methanol in the autoclave was boiled at 220° C. to 225° C. Then methanol was condensed in the condenser tube connected to the autoclave and collected in a collection tank. When the temperature of the top of the condenser tube was reduced to be less than 40° C., the moment was taken as end of esterification, and condensation was carried out immediately.

At the stage of condensation, the temperature of the autoclave was raised to 240° C. to 250° C., and the pressure of the autoclave was reduced to be less than 1 mbar by vacuum pump. Aforesaid temperature and pressure were maintained for about 200 minutes. When the melt flow index (MI) of the melting copolymer in the autoclave reached 16 g/10 min to 18 g/10 min, the moment was taken as completion of condensation. Then the valve of autoclave was opened and the steps of drawing strands and cutting strands into pellets were carried out. Herein, aforesaid MI of the melting copolymer was analyzed at 230° C., and the weight of the melting copolymer was 2.16 kg. The MI was expressed in grams of the melting copolymer flowing through a standard die with diameter of 2.095 mm per 10 minutes.

A water channel with 15° C. flowing water was prepared at the exit of the valve of the autoclave. Aforesaid melting copolymer was cooled and crystallized at the water channel, and drawn into strands. The strands were sent to an extruder (manufacturer: Chen Yu, model: CY-P100) and cut into pellets with grain diameter of 2 mm and length of 3 mm. Driven by the gears of the extruder, the melting copolymer was continuously sent into the water channel and drawn into strands. When the residual was not enough to form strands, the steps of drawing strands and cutting strands into pellets were finished.

EXAMPLES 2 to 7

The production of the TPEE compositions of Examples 2 to 7 was almost the same as the production of the TPEE composition of Example 1. The differences between them were the amounts of DMT, BDO, and PTMEG, and the Mn of PTMEG used in the production. The parameters are listed in Table 1 below.

Apart from the implementation illustrated by aforesaid Examples, a person having ordinary skill in the art can make various modifications and variations to yield the TPEE composition of the instant disclosure without departing from the spirit and scope of the instant disclosure. For example, the timing of adding catalyst could be modified depending on different needs. For example, extra catalyst could be added at the stage of condensation to accelerate the reaction. In other words, the timing of adding catalyst was not limited to the stage of esterification.

COMPARATIVE EXAMPLES 1 TO 3

The production of the TPEE compositions of Comparative Examples 1 to 3 was almost the same as the production of the TPEE composition of Example 1. The differences between them were the amounts of DMT, BDO, and PTMEG, and the Mn of PTMEG used in the production. The parameters are listed in Table 1 below.

COMPARATIVE EXAMPLE 4

The TPEE composition of Comparative Example 4 was a commercial product (manufacturer: DSM Arnitel, model: EM460-08).

The amounts of DMT, BDO, and PTMEG, and the Mn of PTMEG used in the production of the TPEE compositions of Examples 1 to 7 and Comparative Examples 1 to 3 are listed in Table 1 below.

TABLE 1 the amounts of raw materials and the Mn of PTMEG used in the production of Examples 1 to 7 (E1 to E7) and Comparative Examples 1 to 3 (C1 to C3)

|  | Amount of DMT (g) | Amount of BDO (g) | Amount of PTMEG (g) | Mn of PTMEG |
|---|---|---|---|---|
| E1 | 259 | 175 | 300 | 650 |
| E2 | 276 | 192 | 330 | 650 |
| E3 | 233.6 | 150 | 335 | 650 |
| E4 | 233.6 | 150 | 395 | 650 |
| E5 | 233.6 | 150 | 472.5 | 650 |
| E6 | 240 | 168 | 365 | 880 |
| E7 | 260 | 180 | 440 | 1000 |
| C1 | 233.6 | 150 | 630 | 1000 |
| C2 | 156 | 109 | 649 | 2000 |
| C3 | 120 | 100 | 500 | 3000 |

As shown in Table 1, the Mn of PTMEG used in the production of the TPEE compositions of Examples 1 to 7 ranged from 650 to 1000.

TEST EXAMPLE 1: MELTING POINT AND ENTHALPY OF FUSION

The TPEE compositions of Examples 1 to 7 and Comparative Examples 1 to 4 were used as test samples and were analyzed by differential scanning calorimeter (abbreviated as DSC, manufacturer: TA Instrument, model: Q-2000).

An aluminum tray with 10 mg of test sample and a blank aluminum tray were placed at differential scanning calorimeter. The temperature of the differential scanning calorimeter was raised at the speed of 10° C./min from room temperature till the melting peak appeared, and the melting point was recorded. Then the temperature of the differential scanning calorimeter was cooled down at the speed of 10° C./min to room temperature. The enthalpy of fusion was calculated by the area between two curves. One of aforesaid curves started at starting point and ended at melting peak, and the other started at melting peak and ended at ending point. The results are listed in Table 3.

TEST EXAMPLE 2: THE CONTENT OF THE SECOND CHAIN IN THE TPEE COMPOSITION

The TPEE compositions of Examples 1 to 7 and Comparative Examples 1 to 4 were used as test samples and were analyzed by nuclear magnetic resonance spectroscopy (abbreviated as NMR, model: Bruker Avance-500).

In this test example, 40 mg of test sample was dissolved in d-chloroform in sample tubes, and $^1$H-NMR spectra of the test samples were each yielded.

The chemical shifts and the integrals on $^1$H-NMR spectra corresponding to each functional group of the TPEE compositions were analyzed below. The functional groups corresponding to each signal were shown as Formula (I-I) and Formula (II-I) below. The integral of the singlet at chemical shift of 8.06 ppm was set to be 1.000 (corresponding to aryl group which was pointed at "a" position in Formula (I-I) and Formula (II-I) below). The integral B of the singlet at chemical shift between 4.400 ppm and 4.410 ppm (corresponding to butoxy group which was pointed at "b" position in Formula (I-I) below), the integral B' of the triplet at chemical shift between 4.320 ppm and 4.355 ppm (corresponding to butoxy group which was pointed at "b'" position in Formula (II-I) below), and the integral C of the singlet at chemical shift between 3.378 ppm and 3.388 ppm (corresponding to butoxy group which was pointed at "c" position in Formula (II-I) below) are listed in Table 2.

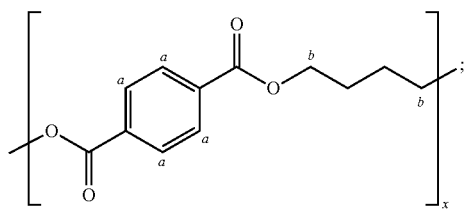

Formula (I-I)

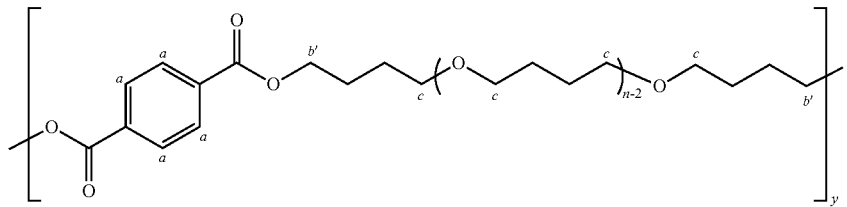

Formula (II-I)

The content of the second chain in the TPEE composition was rendered by $(72 \times n+148)/(72 \times n+148+220 \times x)$. Wherein, y in Formula (II-I) was set to be 1, x was the ratio of the average repeated unit of the first chain to the second chain, x was rendered by (integral B)/(integral B'), n was average repeated unit of $(O(CH_2)_4)$ in one unit of the second chain, and n was rendered by [(integral C)/(integral B')]+1. The content of the second chain in the TPEE composition was abbreviated as "content of the second chain". The results are listed in Table 2 and Table 3.

TABLE 2 integral B, integral B', integral C, x/y, n, and content of the second chain analyzed by $^1$H-NMR of the TPEE compositions of Examples 1 to 7 (E1 to E7) and Comparative Examples (C1 to C4)

| | Integral B | Integral B' | Integral C | x/y | n | Content of the second chain (wt %) |
|---|---|---|---|---|---|---|
| E1 | 0.654 | 0.374 | 2.427 | 1.749 | 7.489 | 64.11 |
| E2 | 0.664 | 0.363 | 2.452 | 1.829 | 7.755 | 63.71 |
| E3 | 0.586 | 0.428 | 2.854 | 1.369 | 7.668 | 69.92 |
| E4 | 0.507 | 0.508 | 3.324 | 0.998 | 7.543 | 75.89 |
| E5 | 0.426 | 0.601 | 4.055 | 0.709 | 7.747 | 81.90 |
| E6 | 0.664 | 0.355 | 3.446 | 1.870 | 10.707 | 69.07 |
| E7 | 0.670 | 0.344 | 3.837 | 1.948 | 12.154 | 70.48 |
| C1 | 0.484 | 0.541 | 6.191 | 0.895 | 12.444 | 84.13 |
| C2 | 0.6 | 0.429 | 10.569 | 1.399 | 25.636 | 86.63 |
| C3 | 0.747 | 0.288 | 10.722 | 2.594 | 38.229 | 83.56 |
| C4 | 0.805 | 0.222 | 2.26 | 3.626 | 11.180 | 54.43 |

As shown in Table 2, the ratio of the average repeated unit of the first chain to the second chain (x/y) of the TPEE compositions of Examples 1 to 7 was greater than or equal to 0.7 and less than or equal to 2.0, and the average repeated unit of $(O(CH_2)_4)$ in one unit of the second chain (n) of the TPEE compositions of Examples 1 to 7 was greater than or equal to 7 and less than or equal to 13.

As shown in Table 2, the content of the second chain in the TPEE composition of Examples 1 to 7 was greater than or equal to 60 wt % and less than or equal to 82 wt %, which was different from the content of the second chain in the TPEE composition of Comparative Examples 1 to 4.

TEST EXAMPLE 3: FEASIBILITY OF MASS PRODUCTION

The feasibility of mass production of the TPEE compositions of Examples 1 to 7 and Comparative Examples 1 to 4 was evaluated based on two aspects. One aspect was the energy required to heat the TPEE composition, and the other was whether the melting copolymer sent to the extruder could be cut into uniform pellets with grain diameter of 2 mm and length of 3 mm properly in production of the TPEE composition.

The melting point of TPEE composition greater than 160° C. meant that heating TPEE composition required more energy, which was not beneficial to mass production. Besides, when melting copolymer was cut into pellets, the cutting blade was easily wrapped and/or wound by the melting copolymer such that the operator needed to halt the procedure of cutting strands into pellets and to manually remove the melting copolymer surrounding the cutting blade, which was not beneficial to mass production. On the other hand, the quality of pellets was not acceptable or the sizes of pellets were not uniform (e.g. The melting copolymer was not cut off completely such that the appearance of aforesaid pellets had indentation defects left by the cutting blade or the length of aforesaid pellets was as large as 10 mm.) meant that the production yield rate of cutting strands into pellets was not good, which was not beneficial to mass production. Moreover, at the subsequent processes of packing, transportation or storage, the phenomenon that aforesaid pellets stuck to each other were observable by naked eyes was not beneficial to mass production.

According to the evaluations above, if the TPEE composition had any one of the following problems that (1) energy consumption for heating was too high, (2) the cutting blade was easily wrapped and/or wound by melting copolymer at the stage of cutting strands into pellets, (3) pellets cut from aforesaid strands were of bad quality or in non-uniform size, and (4) pellets were more likely stuck to each other at the stage of packing, transportation or storage, the TPEE composition was determined to be not beneficial to mass production, and the feasibility of mass production was ranked as "X". On the contrary, if none of the aforesaid problems (1) to (4) was observed, the TPEE composition was determined to be beneficial to mass production, and the feasibility of mass production was ranked as "O". According to this, the results are listed in Table 3 below.

TABLE 3 melting point, enthalpy of fusion, ratio of the average repeated unit of the first chain to the second chain (x/y), average repeated unit of (O(CH$_2$)$_4$) in one unit of the second chain (n), content of the second chain, and feasibility of mass production of the TPEE compositions of Examples 1 to 7 (E1 to E7) and Comparative Examples (C1 to C4)

| | Melting point (° C.) | Enthalpy of fusion (J/g) | x/y | n | Content of the second chain (wt %) | Feasibility of mass production |
|---|---|---|---|---|---|---|
| E1 | 153.4 | 11.4 | 1.749 | 7.489 | 64.11 | O |
| E2 | 150.9 | 13.19 | 1.829 | 7.755 | 63.71 | O |
| E3 | 135.03 | 10.02 | 1.369 | 7.668 | 69.92 | O |
| E4 | 115.21 | 11.44 | 0.998 | 7.543 | 75.89 | O |
| E5 | 88.01 | 7.096 | 0.709 | 7.747 | 81.90 | O |
| E6 | 153.6 | 17.54 | 1.870 | 10.707 | 69.07 | O |
| E7 | 150.3 | 14.5 | 1.948 | 12.154 | 70.48 | O |
| C1 | 101.45 | 3.711 | 0.895 | 12.444 | 84.13 | X |
| C2 | 135.4 | 3.12 | 1.399 | 25.636 | 86.63 | X |
| C3 | 164.1 | 4.34 | 2.594 | 38.229 | 83.56 | X |
| C4 | 187.84 | 24.81 | 3.626 | 11.180 | 54.43 | X |

As shown in Table 3, the melting point of the TPEE compositions of Examples 1 to 7 was less than 160° C., and the enthalpy of fusion of the TPEE compositions of Examples 1 to 7 was greater than 6 J/g. Therefore, the production of the TPEE compositions of Examples 1 to 7 had the following characteristics that (1) heating the TPEE compositions would not consume too much energy, (2) the cutting blade would not be easily wrapped and/or wound by melting copolymer at the stage of cutting strands into pellets, (3) aforesaid pellets of good quality and in uniform size could be yielded, and (4) aforesaid pellets would not stick to each other at the subsequent process of packing, transportation or storage were beneficial to mass production.

On the contrary, the TPEE compositions of Comparative Examples 1 to 4 had any one of the aforesaid problems (1) to (4). Therefore, the TPEE compositions of Comparative Examples 1 to 4 were not beneficial to mass production and the defect in prior art could not be resolved by the TPEE compositions of Comparative Examples 1 to 4.

Besides, the melting point of the TPEE compositions of Examples 4 and 5 was greater than or equal to 80° C. and less than or equal to 120° C., which was beneficial to mass production. Since the melting point of the TPEE compositions of Examples 4 and 5 was close to the melting point of EVA, the TPEE compositions of Examples 4 and 5 were able to be manufactured by process equipment of EVA depending on different needs, which had the merit of saving manufacturing cost for production of TPEE.

In summary, the TPEE composition of the instant disclosure with melting point greater than or equal to 80° C. and less than or equal to 160° C. and enthalpy of fusion greater than 6 J/g can reduce the energy consumption of producing the TPEE composition, and resolve problems related to cutting strands into pellets and subsequent manufacturing process, which is beneficial to mass production. Therefore, the industrial values of the TPEE composition and the TPEE product are both increased.

What is claimed is:

1. A thermoplastic polyether ester elastomer (TPEE) composition comprising a first chain and a second chain connected to each other;

the first chain represented by the following Formula (I):

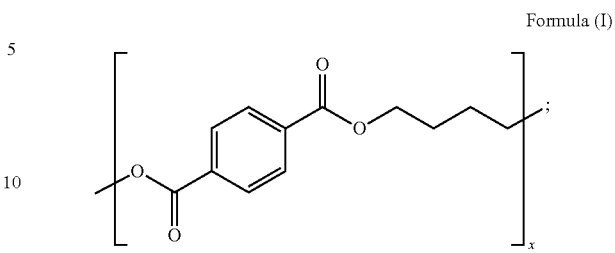

Formula (I)

the second chain represented by the following Formula (II):

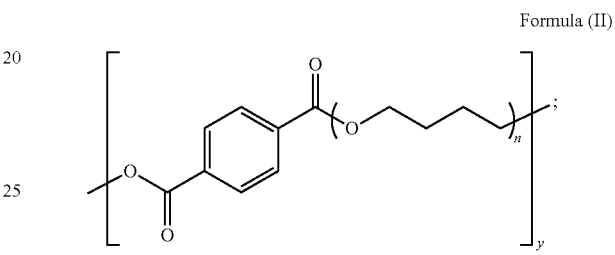

Formula (II)

wherein, a ratio of x to y is greater than or equal to 0.5 and less than or equal to 2.0, n is greater than or equal to 6 and less than or equal to 15, the melting point (Tm) of the thermoplastic polyether ester elastomer composition is greater than or equal to 80° C. and less than or equal to 160° C., and the enthalpy of fusion (ΔHm) of the thermoplastic polyether ester elastomer composition is greater than 6 J/g.

2. The thermoplastic polyether ester elastomer composition as claimed in claim 1, wherein the content of the second chain in the thermoplastic polyether ester elastomer composition is greater than or equal to 55 wt % and less than or equal to 83 wt %.

3. The thermoplastic polyether ester elastomer composition as claimed in claim 2, wherein the content of the second chain in the thermoplastic polyether ester elastomer composition is greater than or equal to 60 wt % and less than or equal to 82 wt %.

4. The thermoplastic polyether ester elastomer composition as claimed in claim 1, wherein the enthalpy of fusion of the thermoplastic polyether ester elastomer composition is greater than or equal to 7 J/g and less than or equal to 20 J/g.

5. The thermoplastic polyether ester elastomer composition as claimed in claim 1, wherein the ratio of x to y is greater than or equal to 0.7 and less than or equal to 2.0.

6. The thermoplastic polyether ester elastomer composition as claimed in claim 1, wherein n is greater than or equal to 7 and less than or equal to 13.

7. The thermoplastic polyether ester elastomer composition as claimed in claim 1, wherein a number-average molecular weight (Mn) of (O(CH$_2$)$_4$)$_n$ in the second chain is greater than or equal to 500 and less than or equal to 1200.

8. The thermoplastic polyether ester elastomer composition as claimed in claim 7, wherein the number-average molecular weight (Mn) of (O(CH$_2$)$_4$)$_n$ in the second chain is greater than or equal to 500 and less than or equal to 1000.

9. The thermoplastic polyether ester elastomer composition as claimed in claim 1, wherein the thermoplastic polyether ester elastomer composition is condensed by 1,4-butanediol, poly(tetramethylene ether) glycol, and dimethyl terephthalate or p-terephthalic acid.

10. A thermoplastic polyether ester elastomer product, comprising the thermoplastic polyether ester elastomer composition as claimed in claim 1.

11. The thermoplastic polyether ester elastomer product as claimed in claim 10, wherein the thermoplastic polyether ester elastomer product is a shoe material, a wire material, a sealing material, an electronic device case, a wire material of 3D printing, a vehicle material, an insulation material of power cord, a foam material, a medical treatment container, a medical treatment tube, a packaging material, an acoustic insulation material or a thermal insulation material.

\* \* \* \* \*